(No Model.)
E. LEMAY.
POTATO DIGGER.
No. 568,449. Patented Sept. 29, 1896.
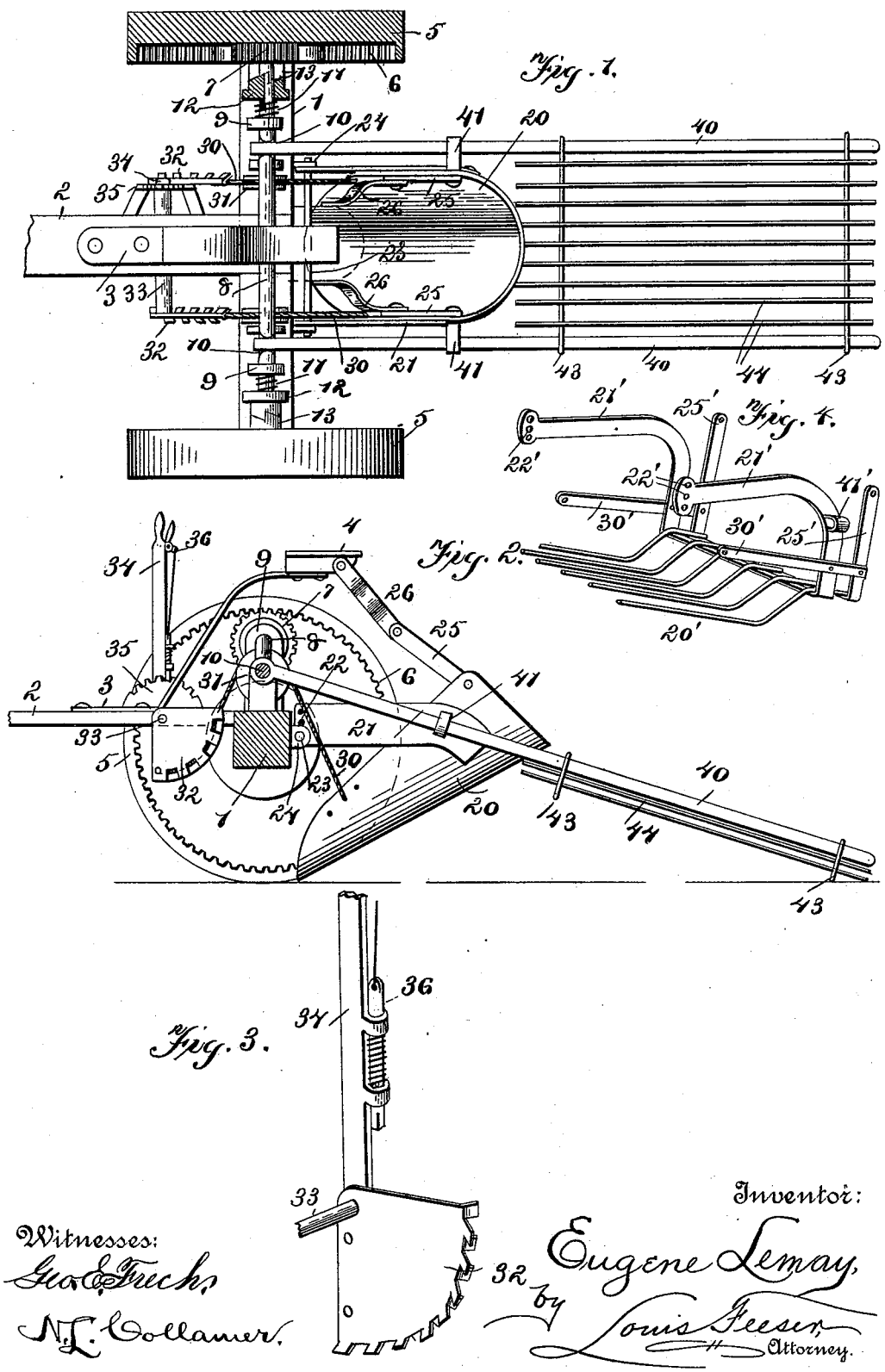
Witnesses:
Geo. E. Frech,
N. L. Collamer.
Inventor:
Eugene Lemay,
by Louis Feeser,
Attorney.
THE NORRIS PETERS CO., PHOTO-LITHO., WASHINGTON, D. C.

UNITED STATES PATENT OFFICE.

EUGENE LEMAY, OF MENDOTA, MINNESOTA.

POTATO-DIGGER.

SPECIFICATION forming part of Letters Patent No. 568,449, dated September 29, 1896.

Application filed October 14, 1895. Serial No. 565,545. (No model.)

*To all whom it may concern:*

Be it known that I, EUGENE LEMAY, a citizen of the United States, residing at Mendota, in the county of Dakota and State of Minnesota, have invented certain new and useful Improvements in Potato-Diggers, of which the following is a specification.

This invention relates to potato-diggers, more especially of that class employing a plow and a vibratory screen; and the object of the same is to effect certain improvements in machines of this character.

To this end the invention consists in the details of construction set forth below and illustrated in the accompanying drawings, wherein—

Figure 1 is a plan view with the seat removed and one clutch in section. Fig. 2 is a longitudinal section through one crank. Fig. 3 is a detail of the adjusting-lever. Fig. 4 is a perspective detail of another form of scoop applicable for use with this machine.

Referring to the said drawings, the numeral 1 designates the framework, from which the tongue or pole 2 projects forward for the attachment of the team, as usual, and 3 is a spring supporting the driver's seat 4.

5 are two bull-wheels having inwardly-projecting teeth or cogs 6 on the inner edges of their rims, and 7 are small gears engaging these teeth, as seen in Fig. 2.

8 is a shaft extending across the framework 1 under the spring 3 and journaled near its ends in two upright standards 9, rising from the framework, and 10 are two cranks in this shaft, as shown. Just outside the standards springs 11, coiled on the shaft, press normally outward clutches 12, which are splined on the shaft and have ratchet-teeth engaging similar teeth 13 on the inner hubs of the gears 7, by which means forward movement of the tops of the bull-wheels 5 rotates the gears 7, but backward movement thereof will not turn the gears to the rear because of the presence of the backing-ratchets, all as will be clearly understood.

The numeral 20 designates the scoop or plow, which stands in rear of the framework and is preferably of about the shape shown. 21 are arms projecting forward from the sides of the scoop and provided with several holes 22 in their front ends, and 23 is a rod passing through one pair of such holes and supported by eyes 24, projecting to the rear from the framework; or any other suitable form of hinge-joint might be here employed without departing from the spirit of my invention. From the rear corners of the scoop 20 rise links 25, pivoted to other links 26, and the latter are in turn pivoted to the sides of the seat 4, whereby the latter has a yielding vertical movement without necessarily imparting such movement to the plow, while the scoop is always maintained in position and prevented from lateral motion. Its front end of course embeds the soil to a proper distance to dig the potatoes therefrom, as is common in machines of this same general character.

The numerals 30 designate cords or chains connected with the scoop near its mouth and at its sides, leading thence upward over pulleys 31, mounted on the framework 1, above the main axle and beneath the shaft 8, (here shown as a spool with two pulleys at its extremities,) and thence forward and downward under two segments 32, mounted rigidly on opposite ends of a shaft 33, journaled through the tongue 2, and 34 is a hand-lever rising from this shaft at the driver's right and alongside a toothed segment 35, with which a thumb-lever 36 on the hand-lever engages to hold it in adjusted position. By this arrangement the driver, from his seat, may lean forward and grasp the hand-lever, and, first releasing the thumb-lever, he may move it forward or backward to raise or lower the mouth of the scoop, as desired. I consider it far better that the chains run under segments on the lever-shaft, for the reason that by this construction a backward pull on the lever raises the weight of the scoop, and it is well known that the driver can pull with more force than he can push.

The screen which forms part of this invention comprises two long side bars 40, journaled at their forward ends on the cranks 10 of the shaft 8, and extending thence to the rear alongside the scoop, where they pass through eyes 41, carried thereby, cross-rods 43, connecting the side bars in rear of the scoop, and longitudinal bars or "grate-bars" 44, carried by these cross-rods, as seen in Fig. 1. These grate-bars are set the proper distance apart to permit the passage between them of dirt, leaves, stalks, and small worthless potatoes; but they retain the larger potatoes and pass them off their rear ends in a continuous row, which will be gathered up by a following operator, or a bag may be tied under such rear end to receive the potatoes, if desired.

In Fig. 4 is shown another form of scoop which may be employed in connection with this machine, and in which 20' is the body of the scoop, here formed of forwardly-projecting fingers instead of being solid, as elsewhere shown. 21' are arms projecting forwardly from the rear ends of said fingers and provided with several holes 22' in their front ends. 41' are the eyes, and 25' are rods or links rising from the rear corners of the scoop and adapted to be pivoted to the other links 26, as seen in Fig. 2. As the sides of the scoop are not turned up, as in the last-mentioned figure, additional arms 30' must project forward along the sides and be provided near their front ends with holes for the reception of the cords 30. In all other respects the construction of this scoop is substantially the same as that above described, and it is obvious that its operation will be the same, except that the finer soil and many of the smaller potatoes will pass through between the fingers of the scoop instead of being carried upward by it and delivered onto the screen.

All parts of this machine are of the desired sizes, shapes, proportions, and materials, and considerable change in and addition to the details of construction can be made without departing from the spirit of my invention.

In operation a team is hitched to the tongue and the driver takes his seat and drives to the field. Here he moves the lever from himself, which lets down the mouth of the scoop, and further forward movement draws it into the soil under the potatoes, which are taken up thereby and passed—with the roots, stalks, and dirt—to the rear through the scoop, and out its open rear end into the grate. The forward movement of the bull-wheels rotates the crank-shaft quite rapidly, and its cranks reciprocate the side bars through the eyes in the sides of the scoop, and this motion of the grate sifts out the dirt, &c., and causes the harvested potatoes to be delivered onto the ground in rear of the machine, as desired. The adjustment effected by the use of the lever will be useful for obvious purposes.

What is claimed as new is—

1. In a potato-harvester, the combination with a framework mounted on wheels, teeth on the latter, a shaft journaled in standards on the framework and having two cranks, gears on the shaft engaging the teeth on the supporting-wheels, a backing-ratchet in the shaft, eyes in the rear of such framework, and a rod passing through said eyes; of a scoop carried by the framework, side arms having holes in their front ends whereby said arms are adjustably and removably pivoted on said rod, means for turning the arms around their pivotal support, eyes in the sides of the arms near their rear ends, side bars mounted at their forward ends on said cranks and their bodies passing through said eyes, cross-rods connecting said bars in rear of the scoop, and grate-bars supported by such cross-rods in rear of the scoop, as and for the purpose set forth.

2. In a potato-harvester, the combination with a framework mounted on wheels, teeth on the latter, a shaft journaled in standards on the framework and having two cranks, gears on the shaft engaging the teeth on the supporting-wheels, and a backing-ratchet in the shaft; of a scoop in rear of the framework, side arms thereon pivotally connected with the framework, means for turning the scoop around its pivotal support, eyes in the sides of the scoop, side bars mounted at their forward ends on said cranks and their bodies passing through said eyes, cross-rods connecting said bars in rear of the scoop, and grate-bars supported by such cross-rods, all as and for the purpose set forth.

3. In a potato-harvester, the combination with a framework mounted on wheels, standards rising from the framework, a shaft journaled therein and having two cranks, and means for rotating the shaft from the supporting-wheels; of a scoop in rear of the framework, side arms thereon pivotally connected with the framework, means for turning the scoop around its pivotal support, eyes in the sides of the scoop, side bars mounted at their forward ends on said cranks and their bodies passing through said eyes, cross-rods connecting said bars in rear of the scoop, and grate-bars supported by such cross-rods, all as and for the purpose set forth.

In testimony whereof I have hereunto set my hand in presence of two subscribing witnesses.

EUGENE LEMAY.

Witnesses:
LOUIS FEESER, Jr.,
L. J. DOBNER.